UNITED STATES PATENT OFFICE.

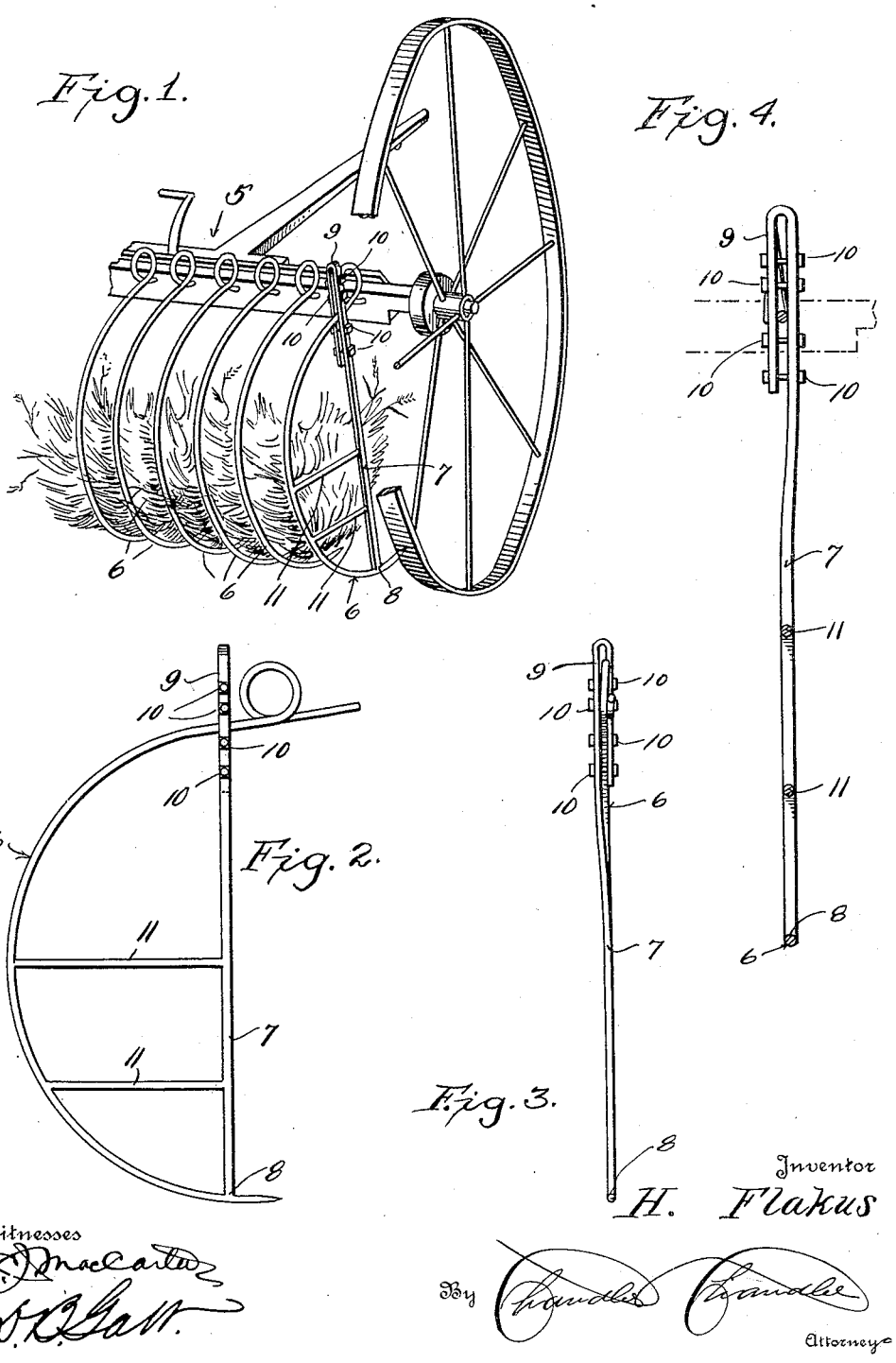

HENRY FLAKUS, OF ELYRIA, NEBRASKA.

HAY-RAKE TOOTH.

1,194,988.  Specification of Letters Patent.  Patented Aug. 15, 1916.

Application filed February 2, 1916. Serial No. 75,759.

*To all whom it may concern:*

Be it known that I, HENRY FLAKUS, a citizen of the United States, residing at Elyria, in the county of Valley, State of Nebraska, have invented certain new and useful Improvements in Hay-Rake Teeth; and I do hereby declare the following to be a full, clear, and exact description of the invention, such as will enable others skilled in the art to which it appertains to make and use the same.

This invention relates to hay rake attachments, and may be more particularly associated with horse rakes.

The primary object of the invention is to provide means capable of application to a horse rake to prevent the hay or straw gathered thereby from becoming jostled or blown from the rake, and to prevent the hay or straw from becoming entangled in the rake wheels.

A further object of the invention is to provide means whereby the greatest possible amount of hay or straw may be gathered by the rake without danger of the same becoming lost therefrom.

A still further object of the invention is to provide means whereby the end teeth or prongs of a horse rake may be adjusted relative to the ground.

A still further object of the invention is to provide means for accomplishing the above mentioned ends, which is of simple and inexpensive construction, which is featured by the absence or lack of intricate or complicated parts, which is capable of ready adjustment, and which will prove thoroughly satisfactory in attaining the ends for which it is designed.

With these objects in view together with others which will appear as the description proceeds, the invention resides in the novel combination and arrangement of parts, all as will be described more fully hereinafter, illustrated in the drawings, and particularly pointed out in the claims.

The invention will be best understood by reference to the accompanying drawings, wherein:

Figure 1, is a fragmentary perspective view of a conventional form of hay rake illustrating the application of the device constructed in accordance with my invention, Fig. 2, is an enlarged elevation of one of the rake tines, Fig. 3, is a front view of one of the rake tines illustrating the application of my appliance, and Fig. 4, is a detail sectional view taken through the device.

Referring now more particularly to the drawings, 5 indicates generally a conventional form of horse drawn rake, the same being provided with the usual bowed tines or teeth 6. In the attainment of the objects of the invention, the end tines or teeth of the rake are equipped with rods 7, each rod being rigidly secured as at 8 adjacent the point end of the tine, and extending therefrom in a straight line across to be adjustably secured at its opposite end to the said tine or tooth preferably adjacent the coil thereof. To effectuate the adjustment of the device, the last named end of the rod 7 may be flattened as shown, and bent upon itself to provide a hook or loop portion 9 for engagement over the adjacent portion of the rake tine. The opposing legs of the hook 9 are provided with alined apertures through which adjusting bolts 10 are extended. The bolts are arranged upon the hook portion such a distance apart as to permit of sliding movement of the tine inclosed thereby a degree sufficient to permit of slight rocking or oscillating movement of the rake tine. It is apparent from this construction that when it is desired to adjust the point of the tooth or tine relatively to the ground it is but necessary to remove the bolts 10 inclosing the upper end of the rake tooth and adjust the tooth upwardly or downwardly as desired, replacing the bolts after the desired adjustment has been made. Bars 11 connect the rod 7 and tine or tooth 6 at various points throughout their extent to prevent hay or straw which has been gathered by the rake from becoming jostled or blown outwardly beyond the end of the rake. It is apparent that this arrangement insures the straw or hay gathered by the rake from becoming entangled in the wheels of the device, or being lost from the rake. It is also obvious that various adjustments of the end teeth may be readily made with the attachment.

While the present disclosure is that of the preferred embodiment of the invention, I am aware that the same is susceptible to various changes in the minor details, and I reserve to myself the right to make such changes as I may think desirable without departing from the spirit of the invention.

I claim:

1. In a device of the class described, the combination with the curved end teeth of a rake, rods rigidly secured at one end adjacent the points of the teeth and extending therefrom to engage over and inclose the opposite ends of said teeth, means for adjusting the last named ends of said teeth relative to said rods, and bars connecting said rods and said teeth intermediate the length of the latter, substantially as described.

2. In combination with the arcuate end tooth of a rake, a rod rigidly secured at one end adjacent said tooth end and extending in a straight line across to the opposite end of said tooth, the said rod being flattened adjacent its free end and bent to form a loop engaging over said tooth, the said flattened portions being provided with spaced alined openings, bolts extending through said openings to be engaged by said tooth, and bars connecting said tooth and rod inwardly from their ends, substantially as described.

In testimony whereof, I affix my signature, in the presence of two witnesses.

HENRY FLAKUS.

Witnesses:
C. E. WOZNICK,
FRANK BOWER.

Copies of this patent may be obtained for five cents each, by addressing the "Commissioner of Patents, Washington, D. C."